United States Patent
Nishioka et al.

(10) Patent No.: US 7,956,130 B2
(45) Date of Patent: Jun. 7, 2011

(54) RUBBER COMPOSITION FOR TIRE AND TIRE USING THE SAME

(75) Inventors: Kazuyuki Nishioka, Kobe (JP); Katsumi Terakawa, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 230 days.

(21) Appl. No.: 12/226,600

(22) PCT Filed: Jul. 20, 2007

(86) PCT No.: PCT/JP2007/064340
§ 371 (c)(1),
(2), (4) Date: Oct. 23, 2008

(87) PCT Pub. No.: WO2008/015923
PCT Pub. Date: Feb. 7, 2008

(65) Prior Publication Data
US 2009/0088528 A1    Apr. 2, 2009

(30) Foreign Application Priority Data

Aug. 1, 2006   (JP) ................................ 2006-209850

(51) Int. Cl.
*C08L 67/04*   (2006.01)
*C08L 81/04*   (2006.01)
*C08L 81/06*   (2006.01)

(52) U.S. Cl. ...................... 525/241; 525/232; 525/326.1; 525/333.3; 525/333.5; 525/384; 525/386; 152/151

(58) Field of Classification Search .................. 525/189, 525/190, 232, 241, 326.1, 333.3, 343, 384, 525/386, 185, 191, 333.5; 526/346; 152/151
See application file for complete search history.

(56) References Cited

U.S. PATENT DOCUMENTS

| 5,162,445 | A |   | 11/1992 | Powers et al. |
| 5,430,095 | A | * | 7/1995  | Ishiura et al. ................. 524/571 |
| 2005/0119399 | A1 | * | 6/2005 | Nishioka et al. ............. 524/502 |
| 2007/0167587 | A1 |   | 7/2007 | Satoh et al. |

FOREIGN PATENT DOCUMENTS

| EP | 0328284 A1 | * | 8/1989 |
| EP | 0 588 287 A2 |   | 3/1994 |
| EP | 0588287 B1 | * | 12/1997 |
| JP | 63-83107 A |   | 4/1988 |
| JP | 63-101440 A |   | 5/1988 |
| JP | 6-65418 A |   | 3/1994 |
| JP | 7-18125 A |   | 1/1995 |
| JP | 9-71686 A |   | 3/1997 |
| JP | 9-241432 A |   | 9/1997 |
| JP | 2000-319447 A |   | 11/2000 |
| JP | 2002-80642 A |   | 3/2002 |
| JP | 2002-97303 A |   | 4/2002 |
| JP | 2005-154696 A |   | 6/2005 |
| JP | 2005-225946 A |   | 8/2005 |
| JP | 2006-137941 A |   | 6/2006 |
| JP | 2006-274046 A |   | 10/2006 |
| JP | 2007-112994 A |   | 5/2007 |
| WO | WO 2005/082946 A1 |   | 9/2005 |
| WO | WO-2005/111096 A1 |   | 11/2005 |

OTHER PUBLICATIONS

Hsieh, H. L. et al Polymer Letters vol. 4, pp. 843-847, published in 1966.*
European Search Report issued Jun. 10, 2010, in corresponding EP 07791077.6.

* cited by examiner

*Primary Examiner* — Irina S Zemel
*Assistant Examiner* — Jeffrey Lenihan
(74) *Attorney, Agent, or Firm* — Birch, Stewart, Kolasch & Birch, LLP

(57) ABSTRACT

A rubber composition for a tire superior in grip performance and abrasion resistance and a tire prepared by using the same are provided. The rubber composition for a tire comprises 3 to 200 parts by weight of an aromatic vinyl polymer having an end modified with —OH, —SH, —COOH, —CSSH, —$SO_3$H, —$(COO)_x$M, —$(SO_3)_x$M or —CO—R (M is a cation, x is an integer of 1 to 3 depending on the valency of M and R is an alkyl group) and having a weight average molecular weight of 300 to 10,000, based on 100 parts by weight of a diene rubber, and the tire is prepared by using the rubber composition.

12 Claims, No Drawings

RUBBER COMPOSITION FOR TIRE AND TIRE USING THE SAME

TECHNICAL FIELD

The present invention relates to a rubber composition for a tire enabling production of a tire having enhanced grip performance and abrasion resistance and a tire prepared by using the same.

BACKGROUND ART

Recently, interest in safety has been increasing while performance and power of an automobile have been improved. A tire is not an exception, and particularly in a tread portion, demands for improving acceleration characteristic and grip performance represented by braking performance have been increasing. For example, improvement in various performances at high speed running is one of them.

Grip performance is dependent on hysteresis loss characteristic of a rubber composition, and for improving the grip performance of a rubber composition, for example, a method of increasing a styrene content and vinyl bond amount of a styrene-butadiene rubber (SBR) to further raise a glass transition temperature (Tg) has been known. However, in this case, not only abrasion resistance is lowered, but also the grip performance at low temperature is lowered, and there is also danger of causing brittleness fracture. Further, for improving the grip performance, a method of using much amount of oil has also been known, but the abrasion resistance is lowered due to lowering of fracture characteristic.

Additionally, a method of using a low molecular weight SBR is also proposed as a method of improving grip performance. However, balance between the grip performance and the abrasion resistance is not adequate. There are also proposed a method of adding an inorganic compound such as tungsten to a rubber composition (for example, refer to JP2000-319447A), a method of adding an acrylic resin (for example, refer to JP2002-80642A), and a method of adding urethane particles (for example, refer to JP2002-97303A). However, a rubber composition exhibiting adequate grip performance has not been obtained in all the cases.

DISCLOSURE OF INVENTION

It is an object of the present invention to provide a rubber composition for a tire superior in grip performance and abrasion resistance of a tire, and a tire prepared by using the same.

The present invention relates to a rubber composition for a tire comprising 3 to 200 parts by weight of an aromatic vinyl polymer having an end modified with —OH, —SH, —COOH, —CSSH, —SO$_3$H, —(COO)$_x$M, —(SO$_3$)$_x$M or —CO—R (M is a cation, x is an integer of 1 to 3 depending on the valency of M, and R is an alkyl group), and having a weight average molecular weight of 300 to 10,000, based on 100 parts by weight of a diene rubber.

A monomer component of the aromatic vinyl polymer is preferably styrene or vinylnaphthalene.

It is preferable that a styrene-butadiene rubber is contained in the diene rubber component in an amount of not less than 60% by weight.

Further, the present invention relates to a tire prepared by using the rubber composition for a tire.

BEST MODE FOR CARRYING OUT THE INVENTION

The rubber composition for a tire of the present invention comprises a diene rubber and an aromatic vinyl polymer.

The diene rubber is not specifically limited, and examples thereof are a natural rubber (NR), an isoprene rubber (IR), a butadiene rubber (BR), a styrene-butadiene rubber (SBR), an acrylonitrile-butadiene rubber (NBR), a chloroprene rubber (CR) and a butyl rubber (IIR). These rubbers may be used alone or two or more kinds thereof may be used in combination. Among these, NR, BR and SBR are preferable because grip performance and abrasion resistance are improved in a highly balanced manner, and SBR is more preferable.

When SBR is used as the diene rubber, the content of SBR in the diene rubber component is preferably not less than 30% by weight, more preferably not less than 50% by weight, further preferably not less than 60% by weight, particularly preferably not less than 70% by weight, most preferably not less than 80% by weight. When the content of SBR is less than 30% by weight, neither adequate grip performance nor adequate abrasion resistance tends to be obtained.

In the present invention, by using an aromatic vinyl polymer having an end modified with —OH, —SH, —COOH, —CSSH, —SO$_3$H, —(COO)$_x$M, —(SO$_3$)$_x$M or —CO—R (M is a cation, x is an integer of 1 to 3 depending on the valency of M and R is an alkyl group), the abrasion resistance is not reduced due to a hysteresis loss caused by an interaction between functional groups at the end of the polymer, and the grip performance can be remarkably improved, and the grip performance and abrasion resistance can be highly balanced. Among the above-mentioned end structures, —OH, —COOH and —(COO)$_x$M are preferable.

When the end of the aromatic vinyl polymer is —(COO)$_x$M or —(SO$_3$)$_x$M, examples of M are, for instance, alkali metal cations such as sodium and potassium; alkali earth metal cations such as magnesium and calcium; other metal cations such as aluminum, iron, zinc, nickel and cobalt; nitrogen cations such as ammonium, and phosphorous cations such as phosphonium. Among these, sodium, magnesium, aluminum and ammonium are preferable from the viewpoint of availability and cost.

When the end of the aromatic vinyl polymer is —CO—R, R is preferably an alkyl group.

The number of carbon atoms of R is preferably 1 to 15, more preferably 1 to 10. When the number of carbon atoms of R is more than 15, an effect by the modification is small and no adequate improvement effect of the grip performance and abrasion resistance tends to be obtained.

The aromatic vinyl polymer used in the present invention means a polymer obtained by substantially polymerizing only an aromatic vinyl monomer. The aromatic vinyl polymer may be obtained by polymerizing an aromatic vinyl monomer alone or may be obtained by polymerizing two or more aromatic vinyl monomers. When a large amount of monomer other than the aromatic vinyl monomer such as a conjugated diene monomer is contained as the monomer component, compatibility with the diene rubber is inferior and further, since the monomer other than the aromatic vinyl monomer is co-crosslinked with the diene rubber at the time of vulcanization, strength is lowered and the abrasion resistance is deteriorated, which is not preferable.

Examples of the monomer component of the aromatic vinyl polymer are aromatic vinyl monomers such as styrene, α-methylstyrene, 1-vinylnaphthalene, 3-vinyl toluene, ethyl vinyl benzene, divinyl benzene, 4-cyclohexylstyrene and 2,4,6-trimethylstyrene. Among these, styrene and 1-vinylnaphthalene are preferable from the viewpoint of polymerization activity, availability and an improvement effect of the grip performance.

The weight average molecular weight (Mw) of the aromatic vinyl polymer is not less than 300, preferably not less than 400. When the Mw of the aromatic vinyl polymer is less than 300, adequate abrasion resistance cannot be obtained. Further, the Mw of the aromatic vinyl polymer is not more than 10,000, preferably not more than 5,000. When the Mw of the aromatic vinyl polymer exceeds 10,000, the grip performance is lowered.

The content of the aromatic vinyl polymer is not less than 3 parts by weight, preferably not less than 5 parts by weight based on 100 parts by weight of the diene rubber. When the content of the aromatic vinyl polymer is less than 3 parts by weight, an improvement effect of the grip performance is small. Further, the content of the aromatic vinyl polymer is not more than 200 parts by weight, preferably not more than 150 parts by weight. When the content of the aromatic vinyl polymer exceeds 200 parts by weight, the abrasion resistance is lowered.

It is preferable that the rubber composition for a tire of the present invention further comprises a reinforcing filler. Examples of the reinforcing filler are a carbon black, silica, calcium carbonate, magnesium carbonate, clay, alumina and talc, and those which have been usually used in the rubber composition for a tire can be used without specific limitation. These reinforcing fillers may be used alone or two or more kinds thereof may be used in combination. However, mainly the carbon black is preferable.

The nitrogen adsorption specific surface area ($N_2SA$) of the carbon black is preferably not less than 80 $m^2/g$, more preferably not less than 100 $m^2/g$. When the $N_2SA$ of the carbon black is less than 80 $m^2/g$, both of the grip performance and abrasion resistance tend to be lowered. Further, the $N_2SA$ of the carbon black is preferably not more than 280 $m^2/g$, more preferably not more than 200 $m^2/g$. When the $N_2SA$ of the carbon black exceeds 280 $m^2/g$, good dispersion is hardly attained and the abrasion resistance tends to be lowered.

When the carbon black is added as the reinforcing filler, the content of the carbon black is preferably not less than 10 parts by weight, more preferably not less than 20 parts by weight based on 100 parts by weight of the diene rubber. When the content of the carbon black is less than 10 parts by weight, the abrasion resistance tends to be lowered. Further, the content of the carbon black is preferably not more than 200 parts by weight, more preferably not more than 150 parts by weight. When the content of the carbon black exceeds 200 parts by weight, processability tends to be lowered.

Further, various chemicals which are generally used in the rubber industry, for example, additives such as a vulcanizing agent such as sulfur, various vulcanization accelerators, various softening agents, various antioxidants, stearic acid, an oxidation inhibitor and an antiozonant can be compounded in the rubber composition for a tire of the present invention, in addition to the diene rubber, the aromatic vinyl polymer and the reinforcing filler.

Since the rubber composition for a tire of the present invention can highly balance the grip performance and abrasion resistance, it is preferably used particularly as a tread among tire members.

The tire of the present invention is produced by a usual method using the rubber composition for a tire of the present invention. Namely, the rubber composition for a tire of the present invention prepared by compounding the above-mentioned various chemicals as case demands is extruded and processed into, for example, a shape of a tread at an unvulcanized stage and is then laminated with other tire members on a tire molding machine to form an unvulcanized tire. The tire of the present invention is obtained by heating and pressing the unvulcanized tire in a vulcanizer.

EXAMPLES

The present invention is specifically explained based on Examples, but the present invention is not limited thereto.

Chemicals used in Examples and Comparative Examples are collectively explained hereinafter.

Styrene-butadiene rubber (SBR): NIPOL NS116 available from ZEON Corporation.

Natural rubber (NR): RSS#3 available from Tech Bee Hung Co., Ltd.

Carbon black: SHOWBLACK N220 ($N_2SA$: 125 $m^2/g$) available from CABOT JAPAN K. K.

Antioxidant: NOCRAC 6C (N-1,3-dimethylbutyl-N'-phenyl-p-phenylenediamine) available from Ouchi Shinko Chemical Industrial Co., Ltd.

Stearic acid: available from NOF CORPORATION

Zinc oxide: Zinc Oxide No. 1 available from Mitsui Mining & Smelting Co., Ltd.

Sulfur: Sulfur powder available from Tsurumi Chemical Industry Co., Ltd.

Vulcanization accelerator: Nocceler NS (N-tert-butyl-2-benzothiazolylsulfenamide) available from Ouchi Shinko Chemical Industrial Co., Ltd.

<Synthesis of Aromatic Vinyl Polymers (1) to (11)>

(Synthesis of Aromatic Vinyl Polymer (1))

Into a 100 ml container, the inside of which had been sufficiently replaced with nitrogen, 50 ml of cyclohexane, 2 ml of tetrahydrofuran, 5 g of styrene and 6.2 ml of a hexane solution of 1.6 mol/l of n-butyl lithium were mixed, and the mixture was stirred at room temperature for 1 hour and then, the reaction was stopped by adding 2 ml of methanol to synthesize the aromatic vinyl polymer (1).

(Synthesis of Aromatic Vinyl Polymer (2))

The aromatic vinyl polymer (2) was synthesized in the same manner as the aromatic vinyl polymer (1) except that 1.2 ml of styrene oxide was added in place of 2 ml of methanol.

(Synthesis of Aromatic Vinyl Polymer (3))

The aromatic vinyl polymer (3) was synthesized in the same manner as the aromatic vinyl polymer (1) except that 7.5 g of 1-vinylnaphthalene was mixed in place of 5 g of styrene and 1.2 ml of styrene oxide was added in place of 2 ml of methanol.

(Synthesis of Aromatic Vinyl Polymer (4))

The aromatic vinyl polymer (4) was synthesized in the same manner as the aromatic vinyl polymer (1) except that 0.8 ml of propylene sulfide was added in place of 2 ml of methanol.

(Synthesis of Aromatic Vinyl Polymer (5))

The aromatic vinyl polymer (5) was synthesized in the same manner as the aromatic vinyl polymer (1) except that bubbling of carbon dioxide gas was carried out for 30 minutes before adding 2 ml of methanol.

(Synthesis of Aromatic Vinyl Polymer (6))

The aromatic vinyl polymer (6) was synthesized in the same manner as the aromatic vinyl polymer (1) except that 0.6 ml of carbon disulfide was added before adding 2 ml of methanol.

(Synthesis of Aromatic Vinyl Polymer (7))

The aromatic vinyl polymer (7) was synthesized in the same manner as the aromatic vinyl polymer (1) except that 0.9 ml of 1,3-propanesultone was added before adding 2 ml of methanol.

(Synthesis of Aromatic Vinyl Polymer (8))

Into a 200 ml container, the inside of which had been sufficiently replaced with nitrogen, 50 ml of cyclohexane, 50 ml of distilled water, 5.0 g of the aromatic vinyl polymer (5) and 0.4 g of magnesium hydroxide were added and the mixture was stirred at room temperature for 1 hour to synthesize the aromatic vinyl polymer (8).

(Synthesis of Aromatic Vinyl Polymer (9))

The aromatic vinyl polymer (9) was synthesized in the same manner as the aromatic vinyl polymer (8) except that 0.26 g of aluminum hydroxide was added in place of 0.4 g of magnesium hydroxide.

(Synthesis of Aromatic Vinyl Polymer (10))

The aromatic vinyl polymer (10) was synthesized in the same manner as the aromatic vinyl polymer (9) except that the aromatic vinyl polymer (7) was added in place of the aromatic vinyl polymer (5).

(Synthesis of Aromatic Vinyl Polymer (11))

The aromatic vinyl polymer (11) was synthesized in the same manner as the aromatic vinyl polymer (1) except that 2.0 ml of ethyl acetate was added in place of 2 ml of methanol.

The monomer components, end structures and weight average molecular weights (Mw) of the obtained aromatic vinyl polymers (1) to (11) are shown below. The end structures of the aromatic vinyl polymers (1) to (11) were confirmed by measuring absorption spectrum using a Fourier-transform infrared spectrophotometer (FT-IR) manufactured by JEOL Ltd., each of molecular weights (Mw) was measured using a GPC-8000 series manufactured by TOSOH Corporation and a differential scanning calorimeter as a detector, and calibrated based on standard polystyrene.

Aromatic vinyl polymer (1) (monomer component: styrene, end structure: no modification, Mw: 580)

Aromatic vinyl polymer (2) (monomer component: styrene, end structure: —OH, Mw: 700)

Aromatic vinyl polymer (3) (monomer component: 1-vinylnaphthalene, end structure: —OH, Mw: 950)

Aromatic vinyl polymer (4) (monomer component: styrene, end structure: —SH, Mw: 650)

Aromatic vinyl polymer (5) (monomer component: styrene, end structure: —COOH, Mw: 630)

Aromatic vinyl polymer (6) (monomer component: styrene, end structure: —CSSH, Mw: 660)

Aromatic vinyl polymer (7) (monomer component: styrene, end structure: —SO$_3$H, Mw: 720)

Aromatic vinyl polymer (8) (monomer component: styrene, end structure: —(COO)$_2$Mg, Mw: 1,350)

Aromatic vinyl polymer (9) (monomer component: styrene, end structure: —(COO)$_3$Al, Mw: 2,050)

Aromatic vinyl polymer (10) (monomer component: styrene, end structure: —(SO$_3$)$_2$Mg, Mw: 2,290)

Aromatic vinyl polymer (11) (monomer component: styrene, end structure: —CO—CH$_3$, Mw: 700)

Examples 1 to 14 and Comparative Examples 1 to 2

Chemicals other than sulfur and a vulcanization accelerator were kneaded according to the compounding prescriptions shown in Tables 1 and 2 under the condition of 150° C. for 5 minutes using a Banbury mixer to obtain kneaded products. Then, sulfur and the vulcanization accelerator were added to the obtained kneaded products and the mixtures were kneaded under the condition of 50° C. for 5 minutes using an open roll, to obtain unvulcanized rubber compositions. The vulcanized rubber compositions of Examples 1 to 14 and Comparative Examples 1 to 2 were prepared by vulcanizing the obtained unvulcanized rubber compositions under the condition of 170° C. for 20 minutes. Further, in the following respective evaluation tests, Comparative Example 1 was taken as a reference compounding for Examples 1 to 10 and Comparative Example 1 (Table 1), and Comparative Example 2 was taken as a reference compounding for Examples 11 to 14 and Comparative Example 2 (Table 2), respectively.

(Abrasion Resistance)

Abrasion was carried out for 3 minutes under the conditions of room temperature, an applying load of 1.0 kgf and a slip ratio of 30% using a Lambourn abrasion tester to measure wear weight, and the wear weight was converted to wear volume (hereinafter, referred to as wear amount) by specific gravity. Further, the abrasion resistance index of the reference compounding was regarded as 100 and the wear amount of each compounding was displayed by indices according to the following equation. Further, the larger the abrasion resistance index is, the less the wear amount is and the better the abrasion resistance is.

(Abrasion resistance index)=(Wear amount of reference compounding)/(Wear amount of each compounding)×100

(Grip Performance)

Treads were formed by extruding the unvulcanized rubber compositions into a tread shape with a calender roll by a usual method and laminated with other tire members, and the laminates were vulcanized under the condition of 170° C. for 20 minutes to produce tires with a size of 215/45R17.

The above-mentioned tires were loaded on a vehicle, and the vehicle was run 10 rounds of a test course of an asphalt road surface. A test driver evaluated the grip performance. At this time, the grip performance of the reference compounding was regarded as point 3 and evaluation was carried out based on 5 points. The first round was evaluated as the initial grip performance and the second to tenth rounds were evaluated as the grip performance. The larger the value is, the higher and the better the grip performance is (5: Good, 4: Slightly good, 3: Normal, 2: Slightly bad, 1: Bad).

The test results are shown in Tables 1 and 2.

TABLE 1

| | Example | | | | | | | | | | Comparative Example |
|---|---|---|---|---|---|---|---|---|---|---|---|
| | 1 | 2 | 3 | 4 | 5 | 6 | 7 | 8 | 9 | 10 | 1 |
| | Amount (part by weight) | | | | | | | | | | |
| SBR | 70 | 70 | 70 | 70 | 70 | 70 | 70 | 70 | 70 | 70 | 70 |
| NR | 30 | 30 | 30 | 30 | 30 | 30 | 30 | 30 | 30 | 30 | 30 |
| Carbon black | 60 | 60 | 60 | 60 | 60 | 60 | 60 | 60 | 60 | 60 | 60 |
| Aromatic vinyl polymer (1) | — | — | — | — | — | — | — | — | — | — | 20 |
| Aromatic vinyl polymer (2) | 20 | — | — | — | — | — | — | — | — | — | — |
| Aromatic vinyl polymer (3) | — | 20 | — | — | — | — | — | — | — | — | — |
| Aromatic vinyl polymer (4) | — | — | 20 | — | — | — | — | — | — | — | — |
| Aromatic vinyl polymer (5) | — | — | — | 20 | — | — | — | — | — | — | — |
| Aromatic vinyl polymer (6) | — | — | — | — | 20 | — | — | — | — | — | — |

TABLE 1-continued

|  | Example | | | | | | | | | | Comparative Example |
|---|---|---|---|---|---|---|---|---|---|---|---|
|  | 1 | 2 | 3 | 4 | 5 | 6 | 7 | 8 | 9 | 10 | 1 |
| Aromatic vinyl polymer (7) | — | — | — | — | — | 20 | — | — | — | — | — |
| Aromatic vinyl polymer (8) | — | — | — | — | — | — | 20 | — | — | — | — |
| Aromatic vinyl polymer (9) | — | — | — | — | — | — | — | 20 | — | — | — |
| Aromatic vinyl polymer (10) | — | — | — | — | — | — | — | — | 20 | — | — |
| Aromatic vinyl polymer (11) | — | — | — | — | — | — | — | — | — | 20 | — |
| Antioxidant | 1 | 1 | 1 | 1 | 1 | 1 | 1 | 1 | 1 | 1 | 1 |
| Stearic acid | 2 | 2 | 2 | 2 | 2 | 2 | 2 | 2 | 2 | 2 | 2 |
| Zinc oxide | 3 | 3 | 3 | 3 | 3 | 3 | 3 | 3 | 3 | 3 | 3 |
| Sulfur | 1.5 | 1.5 | 1.5 | 1.5 | 1.5 | 1.5 | 1.5 | 1.5 | 1.5 | 1.5 | 1.5 |
| Vulcanization accelerator | 1.5 | 1.5 | 1.5 | 1.5 | 1.5 | 1.5 | 1.5 | 1.5 | 1.5 | 1.5 | 1.5 |
| Results of evaluation | | | | | | | | | | | |
| Abrasion resistance index | 106 | 102 | 105 | 102 | 105 | 106 | 102 | 104 | 102 | 108 | 100 |
| Grip performance | 3.5 | 4 | 3.5 | 4 | 4 | 3.5 | 4.5 | 4 | 4 | 3 | 3 |

TABLE 2

|  | Example | | | | Comparative Example |
|---|---|---|---|---|---|
|  | 11 | 12 | 13 | 14 | 2 |
| Amount (part by weight) | | | | | |
| SBR | 100 | 100 | 100 | 100 | 100 |
| Carbon black | 100 | 100 | 100 | 100 | 100 |
| Aromatic vinyl polymer (1) | — | — | — | — | 80 |
| Aromatic vinyl polymer (2) | 80 | — | — | — | — |
| Aromatic vinyl polymer (5) | — | 80 | — | — | — |
| Aromatic vinyl polymer (8) | — | — | 80 | — | — |
| Aromatic vinyl polymer (9) | — | — | — | 80 | — |
| Antioxidant | 1 | 1 | 1 | 1 | 1 |
| Stearic acid | 2 | 2 | 2 | 2 | 2 |
| Zinc oxide | 3 | 3 | 3 | 3 | 3 |
| Sulfur | 1.5 | 1.5 | 1.5 | 1.5 | 1.5 |
| Vulcanization accelerator | 1.5 | 1.5 | 1.5 | 1.5 | 1.5 |
| Results of evaluation | | | | | |
| Abrasion resistance index | 109 | 105 | 103 | 101 | 100 |
| Grip performance | 4 | 4.5 | 4.5 | 5 | 3 |

The grip performance and abrasion resistance were improved in all of Examples 1 to 14 in which the aromatic vinyl polymer having a specific end structure is contained in a specified amount.

INDUSTRIAL APPLICABILITY

According to the present invention, there can be provided a rubber composition for a tire in which the grip performance and abrasion resistance are highly balanced by compounding the diene rubber and a specified amount of the aromatic vinyl polymer having a specific end structure and a specific molecular weight; and a tire prepared by using the rubber composition.

The invention claimed is:

1. A rubber composition for a tire, comprising:
a diene rubber and 3 to 200 parts by weight of an aromatic vinyl polymer having an end modified with —OH, —SH, —COOH, —CSSH, —SO$_3$, —(COO)$_x$M, —(SO$_3$)$_x$M— or —CO—R, wherein M is a cation, x is an integer of 1 to 3 depending on the valency of M, and R is an alkyl group having 1 to 15 carbon atoms; and having a weight average molecular weight of 300 to 10,000, based on 100 parts by weight of the diene rubber, said aromatic vinyl polymer being a polymer obtained by polymerizing only aromatic vinyl monomers.

2. The rubber composition for a tire of claim 1, wherein the aromatic vinyl monomers used to make the aromatic vinyl polymer are styrene or vinylnaphthalene.

3. The rubber composition for a tire of claim 1, wherein a styrene-butadiene rubber is contained in the diene rubber component in an amount of not less than 60% by weight.

4. A tire having a tread formed from the rubber composition for a tire of claim 1.

5. A tire having a tread formed from the rubber composition for a tire of claim 2.

6. A tire having a tread formed from the rubber composition for a tire of claim 3.

7. The rubber composition for a tire of claim 3, wherein M is selected from the group consisting of sodium, potassium, magnesium, aluminum, iron zinc, nickel, cobalt, ammonium, and phosphonium.

8. The rubber composition for a tire of claim 3, wherein M is selected from the group consisting of sodium, magnesium, aluminum, and ammonium.

9. A tire having a tread formed from the rubber composition for a tire of claim 7.

10. A tire having a tread formed from the rubber composition for a tire of claim 8.

11. The rubber composition for a tire of claim 3, wherein the aromatic vinyl polymer is present in an amount of 5 to 150 parts by weight based on 100 parts by weight of the diene rubber, R is an alkyl group having 1 to 10 carbon atoms, and the aromatic vinyl polymer has a weight average molecular weight of 400 to 5,000.

12. A tire having a tread formed from the rubber composition for a tire of claim 11.

* * * * *